US012600806B2

(12) United States Patent
Karasaki

(10) Patent No.: US 12,600,806 B2
(45) Date of Patent: Apr. 14, 2026

(54) VINYL CHLORIDE RESIN COMPOSITION, VINYL CHLORIDE RESIN MOLDED PRODUCT, AND LAMINATE

(71) Applicant: ZEON CORPORATION, Tokyo (JP)

(72) Inventor: Takafumi Karasaki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 823 days.

(21) Appl. No.: 17/905,651

(22) PCT Filed: Mar. 12, 2021

(86) PCT No.: PCT/JP2021/010198

§ 371 (c)(1),
(2) Date: Sep. 6, 2022

(87) PCT Pub. No.: WO2021/193165

PCT Pub. Date: Sep. 30, 2021

(65) Prior Publication Data

US 2023/0105189 A1 Apr. 6, 2023

(30) Foreign Application Priority Data

Mar. 24, 2020 (JP) ................................. 2020-052553

(51) Int. Cl.

| | |
|---|---|
| ***C08F 14/06*** | (2006.01) |
| ***B29C 41/18*** | (2006.01) |
| ***B32B 5/18*** | (2006.01) |
| ***B32B 27/06*** | (2006.01) |
| ***B32B 27/22*** | (2006.01) |
| ***B32B 27/30*** | (2006.01) |
| ***C08G 63/16*** | (2006.01) |
| ***C08K 5/3462*** | (2006.01) |
| *B29K 27/06* | (2006.01) |
| *B29L 9/00* | (2006.01) |
| *B29L 31/30* | (2006.01) |
| *C08L 27/06* | (2006.01) |

(52) U.S. Cl.

CPC .............. *C08F 14/06* (2013.01); *B29C 41/18* (2013.01); *B32B 5/18* (2013.01); *B32B 27/065* (2013.01); *B32B 27/22* (2013.01); *B32B 27/304* (2013.01); *C08G 63/16* (2013.01); *C08K 5/3462* (2013.01); *B29K 2027/06* (2013.01); *B29L 2009/00* (2013.01); *B29L 2031/3005* (2013.01); *B29L 2031/3055* (2013.01); *B32B 2266/0278* (2013.01); *B32B 2605/003* (2013.01); *C08L 27/06* (2013.01)

(58) Field of Classification Search

CPC ........ C08L 27/06; C08L 67/02; C08K 5/3462
See application file for complete search history.

(56) References Cited

U.S. PATENT DOCUMENTS

| | | | | |
|---|---|---|---|---|
| 5,281,647 A * | 1/1994 | Eapen | | C08G 63/20 528/307 |
| 5,859,100 A | 1/1999 | Wehner et al. | | |
| 5,925,696 A | 7/1999 | Wehner et al. | | |
| 6,194,494 B1 | 2/2001 | Wehner et al. | | |
| 10,533,087 B2 | 1/2020 | Iwabuchi | | |
| 2006/0148941 A1 | 7/2006 | Wehner et al. | | |
| 2024/0018338 A1* | 1/2024 | Karasaki | | B29C 41/36 |
| 2024/0262983 A1* | 8/2024 | Karasaki | | B32B 27/22 |

FOREIGN PATENT DOCUMENTS

| | | | | |
|---|---|---|---|---|
| CN | 1515613 A | 7/2004 | | |
| CN | 107109010 A | 8/2017 | | |
| CN | 107501807 A | * 12/2017 | | C08J 3/28 |
| JP | S57105438 A | 6/1982 | | |
| JP | H07268159 A | 10/1995 | | |
| JP | H08291243 A | 11/1996 | | |
| JP | H08337700 A | 12/1996 | | |
| JP | H09125058 A | 5/1997 | | |
| JP | H10158454 A | 6/1998 | | |
| JP | 2006508220 A | 3/2006 | | |
| JP | 2009091540 A | 4/2009 | | |
| JP | 2012197394 A | * 10/2012 | | |
| WO | 2016098344 A1 | 6/2016 | | |
| WO | 2020148982 A1 | 7/2020 | | |
| WO | 2022138937 A1 | 6/2022 | | |

OTHER PUBLICATIONS

Sep. 22, 2022, International Preliminary Report on Patentability issued in the International Patent Application No. PCT/JP2021/010198.

May 18, 2021, International Search Report issued in the International Patent Application No. PCT/JP2021/010198.

May 20, 2025, Communication pursuant to Article 94(3) EPC issued by the European Patent Office in the corresponding European Patent Application No. 21774415.0.

Mar. 19, 2024, the Extended European Search Report issued by the European Patent Office in the corresponding European Patent Application No. 21774415.0.

* cited by examiner

*Primary Examiner* — Eli D. Strah
(74) *Attorney, Agent, or Firm* — KENJA IP LAW PC

(57) ABSTRACT

Provided is a vinyl chloride resin composition having excellent powder fluidity. The vinyl chloride resin composition contains a vinyl chloride resin, a plasticizer, and a uracil compound. The content of the plasticizer is not less than 50 parts by mass and not more than 200 parts by mass relative to 100 parts by mass of the vinyl chloride resin, and the content of the uracil compound is not less than 0.05 parts by mass and not more than 3.00 parts by mass relative to 100 parts by mass of the vinyl chloride resin.

8 Claims, No Drawings

VINYL CHLORIDE RESIN COMPOSITION, VINYL CHLORIDE RESIN MOLDED PRODUCT, AND LAMINATE

TECHNICAL FIELD

The present disclosure relates to a vinyl chloride resin composition, a vinyl chloride resin molded product, and a laminate.

BACKGROUND

Vinyl chloride resins are used in a variety of applications due to generally having excellent characteristics in terms of cold resistance, heat resistance, oil resistance, and so forth.

Specifically, automobile interior materials such as a surface skin formed of a vinyl chloride resin molded product and a laminate obtained by lining a surface skin formed of a vinyl chloride resin molded product with a foamed product such as foamed polyurethane are used in the formation of automobile interior components such as automobile instrument panels and door trims.

A vinyl chloride resin molded product that constitutes a surface skin of an automobile interior component such as an automobile instrument panel is produced, for example, by performing powder molding by a known molding method such as powder slush molding with respect to a vinyl chloride resin composition that contains a vinyl chloride resin, a plasticizer, and additives such as a pigment (for example, refer to Patent Literature (PTL) 1).

In one specific example described in PTL 1, a surface skin formed of a vinyl chloride resin molded product is produced through powder slush molding of a vinyl chloride resin composition that contains vinyl chloride resin particles, a trimellitic acid ester plasticizer, and additives such as a pigment formed of a mixture of phthalocyanine blue, titanium oxide, and carbon.

CITATION LIST

Patent Literature

PTL 1: JP-H8-291243A

SUMMARY

Technical Problem

It is desirable for a vinyl chloride resin composition to have excellent powder fluidity from a viewpoint of easily performing powder molding. A vinyl chloride resin molded product that is obtained through powder molding of a vinyl chloride resin composition having excellent powder fluidity has little non-uniformity in terms of thickness, density, or the like, and thus can suitably be used as a surface skin of an automobile interior component.

However, there is room for improvement of the powder fluidity of the vinyl chloride resin composition according to the conventional technique described above that includes a vinyl chloride resin and a plasticizer.

Accordingly, one object of the present disclosure is to provide a vinyl chloride resin composition that can form a vinyl chloride resin molded product having excellent powder fluidity.

Another object of the present disclosure is to provide a vinyl chloride resin molded product formed using this vinyl chloride resin composition.

Yet another object of the present disclosure is to provide a laminate including this vinyl chloride resin molded product.

Solution to Problem

The inventor conducted diligent investigation with the aim of solving the problem set forth above. The inventor discovered that excellent powder fluidity can be displayed in the case of a vinyl chloride resin composition that contains a vinyl chloride resin, a specific amount of a plasticizer, and a specific amount of a uracil compound, and, in this manner, completed the present disclosure.

Specifically, the present disclosure aims to advantageously solve the problem set forth above, and a presently disclosed vinyl chloride resin composition comprises a vinyl chloride resin, a plasticizer, and a uracil compound, wherein content of the plasticizer is not less than 50 parts by mass and not more than 200 parts by mass relative to 100 parts by mass of the vinyl chloride resin, and content of the uracil compound is not less than 0.05 parts by mass and not more than 3.00 parts by mass relative to 100 parts by mass of the vinyl chloride resin. A vinyl chloride resin composition that contains specific amounts of a plasticizer and a uracil compound in this manner can display excellent powder fluidity.

In the presently disclosed vinyl chloride resin composition, the uracil compound is preferably indicated by formula (I), shown below, (I)

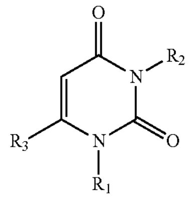

where, in formula (I):

$R_1$ and $R_2$ each represent, independently of each other, a hydrogen atom or an electron donating group; and $R_3$ represents a hydrogen atom or an amino group.

When the uracil compound is a compound indicated by the specific formula shown above, it is possible to achieve a good balance of both powder fluidity of the vinyl chloride resin composition and inhibition of the occurrence of yellowing when the vinyl chloride resin composition is molded at high temperature.

In the presently disclosed vinyl chloride resin composition, the uracil compound preferably includes 6-amino-1,3-dimethyluracil. When the uracil compound includes 6-amino-1,3-dimethyluracil, it is possible to achieve an even better balance of both powder fluidity of the vinyl chloride resin composition and inhibition of the occurrence of yellowing when the vinyl chloride resin composition is molded at high temperature.

In the presently disclosed vinyl chloride resin composition, it is preferable that the plasticizer includes a polyester and the proportional content of the polyester among the plasticizer is 50 mass % or more. When the proportional content of a polyester among the plasticizer is not less than the specific value set forth above, the occurrence of yellowing when the vinyl chloride resin composition is molded at high temperature can be inhibited, and heat shrinkage resistance of a formed vinyl chloride resin molded product can be increased.

The presently disclosed vinyl chloride resin composition is preferably used in powder molding. By using the vinyl chloride resin composition in powder molding, it is easy to obtain a vinyl chloride resin molded product that can be used well as an automobile interior material such as a surface skin for an automobile instrument panel, for example.

Moreover, the presently disclosed vinyl chloride resin composition is preferably used in powder slush molding. By using the vinyl chloride resin composition in powder slush molding, it is even easier to obtain a vinyl chloride resin molded product that can be used well as an automobile interior material such as a surface skin for an automobile instrument panel, for example.

Moreover, the present disclosure aims to advantageously solve the problem set forth above, and a presently disclosed vinyl chloride resin molded product is obtained through molding of any one of the vinyl chloride resin compositions set forth above. A vinyl chloride resin molded product that is obtained through molding of the vinyl chloride resin composition set forth above in this manner has little non-uniformity in terms of thickness, density, or the like, and thus can be used well as an automobile interior material.

The presently disclosed vinyl chloride resin molded product is preferably for an automobile instrument panel surface skin. By using the presently disclosed vinyl chloride resin molded product as a surface skin of an automobile instrument panel, it is possible to produce an automobile instrument panel including a surface skin that has little non-uniformity in terms of thickness, density, or the like.

Furthermore, the present disclosure aims to advantageously solve the problem set forth above, and a presently disclosed laminate comprises: a foamed polyurethane molded product; and any one of the vinyl chloride resin molded products set forth above. A laminate that includes a foamed polyurethane molded product and the vinyl chloride resin molded product set forth above has a vinyl chloride resin molded product part having little non-uniformity in terms of thickness, density, or the like.

The presently disclosed laminate is preferably for an automobile instrument panel. By using the presently disclosed laminate for an automobile instrument panel in this manner, it is possible to reduce non-uniformity in terms of thickness, density, or the like in a surface skin of the produced automobile instrument panel.

Advantageous Effect

According to the present disclosure, it is possible to provide a vinyl chloride resin composition having excellent powder fluidity.

Moreover, according to the present disclosure, it is possible to provide a vinyl chloride resin molded product formed using this vinyl chloride resin composition.

Furthermore, according to the present disclosure, it is possible to provide a laminate including this vinyl chloride resin molded product.

DETAILED DESCRIPTION

The following provides a detailed description of embodiments of the present disclosure.

The presently disclosed vinyl chloride resin composition can be used, for example, in formation of the presently disclosed vinyl chloride resin molded product. Moreover, a vinyl chloride resin molded product formed using the presently disclosed vinyl chloride resin composition can suitably be used, for example, as an automobile interior material such as a surface skin included in an automobile interior component such as an automobile instrument panel or a door trim.

The presently disclosed vinyl chloride resin molded product can be used, for example, in formation of the presently disclosed laminate. Moreover, a laminate formed using the presently disclosed vinyl chloride resin molded product can suitably be used, for example, as an automobile interior material used in production of an automobile interior component such as an automobile instrument panel or a door trim.

(Vinyl Chloride Resin Composition)

A feature of the presently disclosed vinyl chloride resin composition is that it contains: (a) a vinyl chloride resin; (b) a plasticizer; and (c) a uracil compound, and that the content of the (b) plasticizer and the content of the (c) uracil compound are within specific ranges.

Note that the presently disclosed vinyl chloride resin composition may optionally further contain additives other than the (a) vinyl chloride resin, (b) plasticizer, and (c) uracil compound.

The presently disclosed vinyl chloride resin composition has excellent powder fluidity as a result of containing at least the (a) vinyl chloride resin, (b) plasticizer, and (c) uracil compound. Accordingly, the presently disclosed vinyl chloride resin composition can easily be molded by a molding method such as powder molding. Moreover, the presently disclosed vinyl chloride resin composition can form a vinyl chloride resin molded product having little non-uniformity in terms of thickness, density, or the like as a result of having excellent powder fluidity.

Furthermore, the presently disclosed vinyl chloride resin composition can inhibit the occurrence of yellowing when molded at a high temperature of 260° C. or higher, for example, as a result of containing at least the (a) vinyl chloride resin, (b) plasticizer, and (c) uracil compound.

Accordingly, the presently disclosed vinyl chloride resin composition can be used, for example, to obtain a vinyl chloride resin molded product that is suitable as an automobile interior material, such as a surface skin for an automobile instrument panel or a surface skin for a door trim, having little non-uniformity in terms of thickness, density, or the like and having reduced yellowing.

Note that from a viewpoint of easily obtaining a vinyl chloride resin molded product that can be used well as an automobile interior material using the presently disclosed vinyl chloride resin composition, for example, the presently disclosed vinyl chloride resin composition is preferably used in powder molding, and is more preferably used in powder slush molding.

<(a) Vinyl Chloride Resin>

A particulate vinyl chloride resin is normally used as the (a) vinyl chloride resin. For example, one type or two or more types of vinyl chloride resin particles can be included as the (a) vinyl chloride resin, and one type or two or more types of vinyl chloride resin fine particles can optionally be further included as the (a) vinyl chloride resin. In particular, the (a) vinyl chloride resin preferably includes at least vinyl chloride resin particles, and more preferably includes vinyl chloride resin particles and vinyl chloride resin fine particles.

Conventionally known production methods such as suspension polymerization, emulsion polymerization, solution polymerization, and bulk polymerization can be used to produce the (a) vinyl chloride resin.

In the present specification, the term "resin particles" is used to refer to particles having a particle diameter of 30 μm or more, whereas the term "resin fine particles" is used to refer to particles having a particle diameter of less than 30 μm.

Examples of the (a) vinyl chloride resin include homopolymers composed of vinyl chloride monomer units and vinyl chloride copolymers preferably comprising 50 mass % or more of vinyl chloride monomer units, and more preferably comprising 70 mass % or more of vinyl chloride monomer units. Specific examples of monomers (comonomers) that are copolymerizable with vinyl chloride monomer and can be used to form a vinyl chloride copolymer include monomers described in WO2016/098344A1, for example. One of these components may be used individually, or two or more of these components may be used in combination in a freely selected ratio.

<<Vinyl Chloride Resin Particles>>

In the vinyl chloride resin composition, the vinyl chloride resin particles normally function as a matrix resin (base material). The vinyl chloride resin particles are preferably produced by suspension polymerization.

[Average Degree of Polymerization]

The average degree of polymerization of a vinyl chloride resin forming the vinyl chloride resin particles is preferably 800 or more, and more preferably 1,000 or more, and is preferably 5,000 or less, more preferably 3,000 or less, and even more preferably 2,800 or less. This is because sufficient physical strength of a vinyl chloride resin molded product formed using the vinyl chloride resin composition can be ensured while also improving tensile characteristics (particularly tensile elongation), for example, when the average degree of polymerization of the vinyl chloride resin forming the vinyl chloride resin particles is not less than any of the lower limits set forth above. A vinyl chloride resin molded product having good tensile elongation can suitably be used as an automobile interior material, such as a surface skin of an automobile instrument panel, that has excellent ductility and that ruptures as designed without scattering of fragments when an airbag expands and is deployed, for example. Moreover, meltability of the vinyl chloride resin composition can be improved when the average degree of polymerization of the vinyl chloride resin forming the vinyl chloride resin particles is not more than any of the upper limits set forth above.

The "average degree of polymerization" referred to in the present disclosure can be measured in accordance with JIS K6720-2.

[Average Particle Diameter]

The average particle diameter of the vinyl chloride resin particles is normally 30 μm or more, preferably 50 μm or more, and more preferably 100 μm or more, and is preferably 500 μm or less, and more preferably 200 μm or less. This is because powder fluidity of the vinyl chloride resin composition further improves when the average particle diameter of the vinyl chloride resin particles is not less than any of the lower limits set forth above. Moreover, meltability of the vinyl chloride resin composition improves and surface smoothness of a vinyl chloride resin molded product formed using the composition can be improved when the average particle diameter of the vinyl chloride resin particles is not more than any of the upper limits set forth above.

The "average particle diameter" referred to in the present disclosure can be measured as the volume-average particle diameter by laser diffraction in accordance with JIS Z8825.

[Proportional Content]

The proportional content of the vinyl chloride resin particles in the (a) vinyl chloride resin is preferably 70 mass % or more, and more preferably 80 mass % or more, may be 100 mass %, and is preferably 95 mass % or less, and more preferably 90 mass % or less. This is because sufficient physical strength of a vinyl chloride resin molded product formed using the vinyl chloride resin composition can be ensured while also improving tensile elongation when the proportional content of the vinyl chloride resin particles in the (a) vinyl chloride resin is not less than any of the lower limits set forth above. Moreover, powder fluidity of the vinyl chloride resin composition further improves when the proportional content of the vinyl chloride resin particles in the (a) vinyl chloride resin is not more than any of the upper limits set forth above.

<<Vinyl Chloride Resin Fine Particles>>

In the vinyl chloride resin composition, the vinyl chloride resin fine particles normally function as a dusting agent (powder fluidity modifier). The vinyl chloride resin fine particles are preferably produced by emulsion polymerization.

[Average Degree of Polymerization]

The average degree of polymerization of a vinyl chloride resin forming the vinyl chloride resin fine particles is preferably 500 or more, and more preferably 700 or more, and is preferably 2,600 or less, and more preferably 2,400 or less. This is because powder fluidity of the vinyl chloride resin composition further improves, and tensile elongation of a molded product obtained using the composition improves when the average degree of polymerization of the vinyl chloride resin forming the vinyl chloride resin fine particles serving as a dusting agent is not less than any of the lower limits set forth above. Moreover, meltability of the vinyl chloride resin composition improves, and surface smoothness of a vinyl chloride resin molded product formed using the composition improves when the average degree of polymerization of the vinyl chloride resin forming the vinyl chloride resin fine particles is not more than any of the upper limits set forth above.

[Average Particle Diameter]

The average particle diameter of the vinyl chloride resin fine particles is normally less than 30 μm, preferably 10 μm or less, and more preferably 5 μm or less, and is preferably 0.1 μm or more, and more preferably 1 μm or more. This is because the vinyl chloride resin fine particles are not too small to function as a dusting agent, for example, and powder fluidity of the vinyl chloride resin composition further improves when the average particle diameter of the vinyl chloride resin fine particles is not less than any of the lower limits set forth above. Moreover, meltability of the vinyl chloride resin composition increases, and surface smoothness of a formed vinyl chloride resin molded product can be further improved when the average particle diameter of the vinyl chloride resin fine particles is not more than any of the upper limits set forth above.

[Proportional Content]

The proportional content of the vinyl chloride resin fine particles in the (a) vinyl chloride resin may be 0 mass %, but is preferably 5 mass % or more, and more preferably 10 mass % or more, and is preferably 30 mass % or less, and more preferably 20 mass % or less. This is because powder fluidity of the vinyl chloride resin composition further improves when the proportional content of the vinyl chloride resin fine particles in the (a) vinyl chloride resin is not less than any of the lower limits set forth above. Moreover, physical strength of a vinyl chloride resin molded product formed using the vinyl chloride resin composition can be further increased when the proportional content of the vinyl chloride resin fine particles in the (a) vinyl chloride resin is not more than any of the upper limits set forth above.

<(b) Plasticizer>

The presently disclosed vinyl chloride resin composition contains a specific amount of the (b) plasticizer. As a result of the vinyl chloride resin composition containing the (b) plasticizer, a formed vinyl chloride resin molded product can display sufficient flexibility and thus can suitably be used as an automobile interior material, for example.

The content of the (b) plasticizer in the vinyl chloride resin composition is required to be 50 parts by mass or more relative to 100 parts by mass of the (a) vinyl chloride resin, and is preferably 60 parts by mass or more, more preferably 70 parts by mass or more, even more preferably 80 parts by mass or more, and further preferably 90 parts by mass or more relative to 100 parts by mass of the (a) vinyl chloride resin. Moreover, the content of the (b) plasticizer in the vinyl chloride resin composition is required to be 200 parts by mass or less relative to 100 parts by mass of the (a) vinyl chloride resin, and is preferably 180 parts by mass or less, more preferably 160 parts by mass or less, even more preferably 140 parts by mass or less, and further preferably 120 parts by mass or less relative to 100 parts by mass of the (a) vinyl chloride resin. In a situation in which the content of the (b) plasticizer in the vinyl chloride resin composition is less than 50 parts by mass relative to 100 parts by mass of the (a) vinyl chloride resin, the flexibility of a formed vinyl chloride resin molded product decreases. On the other hand, when the content of the (b) plasticizer in the vinyl chloride resin composition is 50 parts by mass or more relative to 100 parts by mass of the (a) vinyl chloride resin, a formed vinyl chloride resin molded product can display sufficient flexibility. Moreover, when the content of the (b) plasticizer in the vinyl chloride resin composition is not less than any of the lower limits set forth above, precipitation (blooming) of components at the surface of a formed vinyl chloride resin molded product can be inhibited. In other words, blooming resistance of a vinyl chloride resin molded product can be increased. Furthermore, in a situation in which the content of the (b) plasticizer in the vinyl chloride resin composition is more than 200 parts by mass relative to 100 parts by mass of the (a) vinyl chloride resin, powder fluidity of the vinyl chloride resin composition decreases. On the other hand, when the content of the (b) plasticizer in the vinyl chloride resin composition is 200 parts by mass or less relative to 100 parts by mass of the (a) vinyl chloride resin, good powder fluidity of the vinyl chloride resin composition can be maintained.

Although no specific limitations are placed on the (b) plasticizer that is contained in the presently disclosed vinyl chloride resin composition, it is preferable to use (b1) a polyester and (b2) a trimellitic acid ester, for example. Note that plasticizers other than the (b1) polyester and (b2) trimellitic acid ester (hereinafter, also referred to as "(b3) other plasticizers") may be used as the (b) plasticizer.

<<(b1) Polyester>>

The (b) plasticizer preferably includes (b1) a polyester. Through inclusion of the (b1) polyester among the (b) plasticizer, heat shrinkage resistance of a formed vinyl chloride resin molded product can be increased.

The (b1) polyester that can be included in the (b) plasticizer is not specifically limited and can, for example, be a polyester such as a polyester including a structural unit derived from adipic acid (adipic acid-based polyester), a polyester including a structural unit derived from sebacic acid (sebacic acid-based polyester), or a polyester including a structural unit derived from phthalic acid (phthalic acid-based polyester). One of these polyesters may be used individually, or two or more of these polyesters may be used as a mixture in a freely selected ratio.

In particular, from a viewpoint further inhibiting the occurrence of yellowing when the vinyl chloride resin composition is molded at high temperature and further increasing heat shrinkage resistance after heating of a formed vinyl chloride resin molded product, it is preferable to use a polyester that includes a structural unit derived from adipic acid as the (b1) polyester, and particularly preferable to use a polyester that includes a structural unit derived from adipic acid and a structural unit derived from 3-methyl-1,5-pentanediol as the (b1) polyester.

In order to facilitate description, a polyester including an adipic acid-derived structural unit and a 3-methyl-1,5-pentanediol-derived structural unit is referred to below as a "polyester A".

Although the polyester A including the specific structural units described above may include structural units other than an adipic acid-derived structural unit and a 3-methyl-1,5-pentanediol-derived structural unit, the total of adipic acid-derived structural units and 3-methyl-1,5-pentanediol-derived structural units is preferably 50 mass % or more of all structural units, and more preferably 80 mass % or more of all structural units. Moreover, the polyester A including the specific structural units described above preferably only includes an adipic acid-derived structural unit and a 3-methyl-1,5-pentanediol-derived structural unit as repeating units.

The polyester A including the specific structural units described above can be obtained through condensation polymerization of adipic acid and 3-methyl-1,5-pentanediol without any specific limitations. This condensation polymerization can be performed in the presence of a catalyst. Moreover, the condensation polymerization can be performed using an alcohol and/or a monobasic acid as a terminal stopping component. The condensation polymerization of adipic acid and 3-methyl-1,5-pentanediol and the termination reaction of the obtained polycondensate and the terminal stopping component may be performed in one go or may be performed separately. A product that is obtained through the condensation polymerization and the termination reaction may be subjected to after-treatment such as distillation. Commonly known conditions can be adopted as the reaction conditions of the condensation polymerization, such as the used amounts of the monomers, the catalyst, and the terminal stopping component described above.

Also note that a commercially available product may be used as the polyester A including the specific structural units described above.

The catalyst used in the condensation polymerization reaction is not specifically limited and may be dibutyltin oxide, tetraalkyl titanate, or the like, for example.

Examples of alcohols that can be used as the terminal stopping component include methanol, ethanol, propanol, isopropanol, butanol, isobutanol, pentanol, hexanol, isohexanol, heptanol, isoheptanol, octanol, isooctanol, 2-ethylhexanol, nonanol, isononanol, decanol, isodecanol, undecanol, isoundecanol, dodecanol, tridecanol, isotridecanol, tetradecanol, pentadecanol, hexadecanol, heptadecanol, octadecanol, cellosolve, carbitol, phenol, nonylphenol, benzyl alcohol, and mixtures thereof.

Examples of monobasic acids that can be used as the terminal stopping component include acetic acid, propionic acid, butyric acid, isobutyric acid, valeric acid, pivalic acid, caproic acid, heptanoic acid, caprylic acid, 2-ethylhexanoic acid, pelargonic acid, capric acid, undecanoic acid, lauric acid, tridecanoic acid, myristic acid, pentadecanoic acid, palmitic acid, heptadecanoic acid, stearic acid, benzoic acid, and mixtures thereof.

Of these examples, 2-ethylhexanol is preferable as the terminal stopping component.

The number-average molecular weight of the polyester A including the specific structural units described above is preferably 1,000 or more, and more preferably 2,000 or more, and is preferably 10,000 or less, and more preferably 7,000 or less.

Note that the "number-average molecular weight" can be measured by VPO (vapor pressure osmometry).

Moreover, the polyester A including the specific structural units described above preferably has an acid value of 1 or less.

Furthermore, the polyester A including the specific structural units described above preferably has a hydroxyl value of 30 or less.

The viscosity of the polyester A including the specific structural units described above is preferably 500 mPa·s or more, and more preferably 1,000 mPa·s or more, and is preferably 8,000 mPa·s or less, and more preferably 5,000 mPa·s or less.

Note that the "viscosity" can be measured in accordance with JIS Z8803 at a temperature of 23° C.

The proportional content of the (b1) polyester among the (b) plasticizer is preferably 50 mass % or more, more preferably 55 mass % or more, and even more preferably 60 mass % or more, and is preferably 90 mass % or less, more preferably 85 mass % or less, and even more preferably 80 mass % or less. When the proportional content of the (b1) polyester among the (b) plasticizer is not less than any of the lower limits set forth above, heat shrinkage resistance of a formed vinyl chloride resin molded product can be further increased. On the other hand, when the proportional content of the (b1) polyester among the (b) plasticizer is not more than any of the upper limits set forth above, good flexibility at low temperature of a formed vinyl chloride resin molded product can be maintained.

The content of the (b1) polyester in the vinyl chloride resin composition is preferably 30 parts by mass or more, more preferably 40 parts by mass or more, even more preferably 50 parts by mass or more, and further preferably 60 parts by mass or more relative to 100 parts by mass of the (a) vinyl chloride resin, and is preferably 120 parts by mass or less, more preferably 100 parts by mass or less, even more preferably 80 parts by mass or less, and further preferably 70 parts by mass or less relative to 100 parts by mass of the (a) vinyl chloride resin. When the content of the (b1) polyester in the vinyl chloride resin composition is not less than any of the lower limits set forth above, heat shrinkage resistance of a formed vinyl chloride resin molded product can be further increased. On the other hand, when the content of the (b1) polyester in the vinyl chloride resin composition is not more than any of the upper limits set forth above, good flexibility at low temperature of a formed vinyl chloride resin molded product can be maintained.

<<(b2) Trimellitic Acid Ester>>

The (b) plasticizer preferably includes (b2) a trimellitic acid ester. Through inclusion of the (b2) trimellitic acid ester among the (b) plasticizer, powder fluidity of the vinyl chloride resin composition can be further increased because the (b2) trimellitic acid ester is absorbed well by the (a) vinyl chloride resin. Moreover, through inclusion of the (b2) trimellitic acid ester among the (b) plasticizer, flexibility at low temperature of a formed vinyl chloride resin molded product can be increased.

The (b2) trimellitic acid ester included among the (b) plasticizer is preferably an ester compound of trimellitic acid and a monohydric alcohol.

Specific examples of the monohydric alcohol include, but are not specifically limited to, aliphatic alcohols such as 1-hexanol, 1-heptanol, 1-octanol, 2-ethylhexanol, 1-nonanol, 1-decanol, 1-undecanol, and 1-dodecanol. Of these examples, an aliphatic alcohol having a carbon number of 6 to 18 is preferable as the monohydric alcohol, and a linear aliphatic alcohol having a carbon number of 6 to 18 is more preferable as the monohydric alcohol.

In particular, the (b2) trimellitic acid ester is preferably a triester compound in which substantially all the carboxy groups of trimellitic acid are esterified with the monohydric alcohol. Alcohol residue portions of the triester compound may all be derived from the same alcohol or may each be derived from a different alcohol.

The (b2) trimellitic acid ester may be one compound or a mixture of different compounds.

Specific examples of the (b2) trimellitic acid ester that are suitable include tri-n-hexyl trimellitate, tri-n-heptyl trimellitate, tri-n-octyl trimellitate, tri(2-ethylhexyl) trimellitate, tri-n-nonyl trimellitate, tri-n-decyl trimellitate, triisodecyl trimellitate, tri-n-undecyl trimellitate, tri-n-dodecyl trimellitate, trialkyl trimellitates (esters including two or more types of alkyl groups having different carbon numbers [with a proviso that the carbon number is 6 to 18] in a molecule), tri-n-alkyl trimellitates (esters including two or more types of alkyl groups having different carbon numbers [with a proviso that the carbon number is 6 to 18] in a molecule), and mixtures thereof.

Specific examples of the (b2) trimellitic acid ester that are more preferable include tri-n-octyl trimellitate, tri(2-ethylhexyl) trimellitate, tri-n-nonyl trimellitate, tri-n-decyl trimellitate, tri-n-alkyl trimellitates (esters including two or more types of alkyl groups having different carbon numbers [with a proviso that the carbon number is 6 to 18] in a molecule), and mixtures thereof.

The proportional content of the (b2) trimellitic acid ester among the (b) plasticizer is preferably 10 mass % or more, more preferably 15 mass % or more, and even more preferably 20 mass % or more, and is preferably 50 mass % or less, more preferably 45 mass % or less, and even more preferably 40 mass % or less. When the proportional content of the (b2) trimellitic acid ester among the (b) plasticizer is not less than any of the lower limits set forth above, powder fluidity of the vinyl chloride resin composition can be even further increased, and flexibility at low temperature of a formed vinyl chloride resin molded product can be further increased. On the other hand, when the proportional content of the (b2) trimellitic acid ester among the (b) plasticizer is not more than any of the upper limits set forth above, heat shrinkage resistance of a formed vinyl chloride resin molded product can be increased.

The content of the (b2) trimellitic acid ester in the vinyl chloride resin composition is preferably 20 parts by mass or more, and more preferably 25 parts by mass or more relative to 100 parts by mass of the (a) vinyl chloride resin, and is preferably 80 parts by mass or less, more preferably 60 parts by mass or less, and even more preferably 50 parts by mass or less relative to 100 parts by mass of the (a) vinyl chloride resin. When the content of the (b2) trimellitic acid ester in the vinyl chloride resin composition is not less than any of the lower limits set forth above, powder fluidity of the vinyl chloride resin composition can be even further increased, and flexibility at low temperature of a formed vinyl chloride resin molded product can be further increased. On the other hand, when the content of the (b2) trimellitic acid ester in the vinyl chloride resin composition is not more than any of the upper limits set forth above, heat shrinkage resistance of a formed vinyl chloride resin molded product can be increased.

<<(b3) Other Plasticizers>>

The (b) plasticizer contained in the vinyl chloride resin composition may optionally contain (b3) other plasticizers besides the (b1) polyester and (b2) trimellitic acid ester described above.

Specific examples of the (b3) other plasticizers include plasticizers among those described in WO2016/098344A1 that are plasticizers other than the (b1) polyester and (b2) trimellitic acid ester described above. Of these plasticizers, epoxidized soybean oil is preferable from a viewpoint of further increasing flexibility at low temperature of a formed vinyl chloride resin molded product.

The proportional content of the (b3) other plasticizers among the (b) plasticizer is not specifically limited but is preferably not less than 0 mass % and not more than 15 mass %. When the proportional content of the (b3) other plasticizers among the (b) plasticizer is within the range set forth above, low-temperature tensile elongation after heating of a formed vinyl chloride resin molded product can be further increased.

The content of the (b3) other plasticizers in the vinyl chloride resin composition is not specifically limited and can be set as not less than 0 parts by mass and not more than 15 parts by mass relative to 100 parts by mass of the (a) vinyl chloride resin.

Note that from a viewpoint of further increasing flexibility at low temperature of a formed vinyl chloride resin molded product, it is preferable to use an epoxidized vegetable oil such as epoxidized soybean oil as (b3) another plasticizer in an amount of not less than 2 parts by mass and not more than 7 parts by mass relative to 100 parts by mass of the (a) vinyl chloride resin.

<(c) Uracil Compound>

The presently disclosed vinyl chloride resin composition contains a specific amount of the (c) uracil compound. Through inclusion of the (c) uracil compound, the vinyl chloride resin composition can display excellent powder fluidity. Moreover, as a result of the vinyl chloride resin composition containing the (c) uracil compound, it is possible to inhibit the occurrence of yellowing when the vinyl chloride resin composition is molded at high temperature.

The (c) uracil compound contained in the presently disclosed vinyl chloride resin composition is a compound that has a uracil skeleton.

Moreover, from a viewpoint of further increasing powder fluidity of the vinyl chloride resin composition and further inhibiting the occurrence of yellowing when the vinyl chloride resin composition is molded at high temperature, the (c) uracil compound is preferably indicated by the following formula (I).

(I)

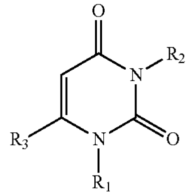

(In formula (I):

$R_1$ and $R_2$ each represent, independently of each other, a hydrogen atom or an electron donating group; and $R_3$ represents a hydrogen atom or an amino group.)

From a viewpoint of achieving a good balance of both powder fluidity of the vinyl chloride resin composition and inhibition of the occurrence of yellowing when the vinyl chloride resin composition is molded at high temperature, it is preferable that at least one of $R_1$ and $R_2$ is an electron donating group, and more preferable that both $R_1$ and $R_2$ are electron donating groups in formula (I).

In a case in which $R_1$ and/or $R_2$ in formula (I) is an electron donating group, the electron donating group may be an alkyl group, an amino group, a dialkylamino group, or the like, without any specific limitations. Of these examples, an alkyl group is preferable as an electron donating group from a viewpoint of achieving an even better balance of both powder fluidity of the vinyl chloride resin composition and inhibition of the occurrence of yellowing when the vinyl chloride resin composition is molded at high temperature, with an alkyl group having a carbon number of 6 or less being more preferable, and a methyl group most preferable.

Note that $R_1$ and $R_2$ in formula (I) may be the same as each other or different from each other.

Specific examples of the (c) uracil compound indicated by formula (I) include uracil, 6-amino-1,3-dimethyluracil, 6-amino-1,3-diethyluracil, 6-amino-1,3-di-n-propyluracil, 6-amino-1,3-di-n-butyluracil, 6-amino-1,3-di-n-pentyluracil, and 6-amino-1,3-di-n-hexyluracil. Of these examples, 6-amino-1,3-dimethyluracil is preferable as the (c) uracil compound from a viewpoint of achieving a good balance of both powder fluidity of the vinyl chloride resin composition and inhibition of the occurrence of yellowing when the vinyl chloride resin composition is molded at high temperature. Note that one of these (c) uracil compounds may be used individually, or two or more of these (c) uracil compounds may be used as a mixture in a freely selected ratio.

The content of the (c) uracil compound in the vinyl chloride resin composition is required to be 0.05 parts by mass or more relative to 100 parts by mass of the (a) vinyl chloride resin, and is preferably 0.10 parts by mass or more, more preferably 0.15 parts by mass or more, even more preferably 0.20 parts by mass or more, further preferably 0.25 parts by mass or more, and even further preferably 0.40 parts by mass or more relative to 100 parts by mass of the (a) vinyl chloride resin. Moreover, the content of the (c) uracil compound in the vinyl chloride resin composition is required to be 3.00 parts by mass or less relative to 100 parts by mass of the (a) vinyl chloride resin, and is preferably 2.00 parts by mass or less, more preferably 1.60 parts by mass or less, even more preferably 1.20 parts by mass or less, and further preferably 0.80 parts by mass or less relative to 100 parts by mass of the (a) vinyl chloride resin. In a situation in which the content of the (c) uracil compound in the vinyl chloride resin composition is less than 0.05 parts by mass relative to 100 parts by mass of the (a) vinyl chloride resin, powder fluidity of the vinyl chloride resin composition decreases. On the other hand, when the content of the (c) uracil compound in the vinyl chloride resin composition is 0.05 parts by mass or more relative to 100 parts by mass of the (a) vinyl chloride resin, the vinyl chloride resin composition can display excellent powder fluidity. Moreover, when the content of the (c) uracil compound in the vinyl chloride resin composition is not less than any of the lower limits set forth above, the occurrence of yellowing when the vinyl chloride resin composition is molded at high temperature can be inhibited. Furthermore, in a situation in which the content of the (c) uracil compound in the vinyl chloride resin composition is more than 3.00 parts by mass relative to 100 parts by mass of the (a) vinyl chloride resin, powder fluidity of the vinyl chloride resin composition decreases. On the other hand, when the content of the (c) uracil compound in the vinyl chloride resin composition is 3.00 parts by mass or less relative to 100 parts by mass of the (a) vinyl chloride resin, the vinyl chloride resin composition can display excellent powder fluidity. Moreover, when the content of the (c) uracil compound in the vinyl chloride resin composition is 0.80 parts by mass or less relative to 100 parts by mass of the (a) vinyl chloride resin, blooming resistance of a vinyl chloride resin molded product can be increased.

<Additives>

The presently disclosed vinyl chloride resin composition may further contain various additives besides the components set forth above. Examples of additives that may be used include, but are not specifically limited to, lubricants; stabilizers such as perchloric acid-treated hydrotalcite, zeolites, β-diketones, and fatty acid metal salts; mold release agents; dusting agents other than the previously described vinyl chloride resin fine particles; impact modifiers; perchloric acid compounds other than perchloric acid-treated hydrotalcite (sodium perchlorate, potassium perchlorate, etc.); antioxidants; fungicides; flame retardants; antistatic agents; fillers; light stabilizers; foaming agents; and pigments.

Additives that are described in WO2016/098344A1, for example, can be used as the aforementioned additives that can be contained in the presently disclosed vinyl chloride resin composition, and suitable amounts thereof may also be the same as described in WO2016/098344A1.

The presently disclosed vinyl chloride resin composition may contain silicone oil.

Note that that the silicone oil that can be contained in the vinyl chloride resin composition may be silicone oil such as described in JP2018-35304A, for example.

The content of the silicone oil in the vinyl chloride resin composition is not specifically limited but is preferably 0.1 parts by mass or more, and more preferably 0.2 parts by mass or more relative to 100 parts by mass of the (a) vinyl chloride resin, and is preferably 1 part by mass or less, and more preferably 0.8 parts by mass or less relative to 100 parts by mass of the (a) vinyl chloride resin.

<Production Method of Vinyl Chloride Resin Composition>

The presently disclosed vinyl chloride resin composition can be produced by mixing the components described above.

Although no specific limitations are placed on the method by which the (a) vinyl chloride resin, (b) plasticizer, (c) uracil compound, and various additives that can be further used as necessary are mixed, a method in which components other than a dusting agent (inclusive of vinyl chloride resin fine particles) are mixed by dry blending and then the dusting agent is subsequently added and mixed therewith, for example, may be adopted. The dry blending is preferably carried out using a Henschel mixer. Although the temperature during dry blending is not specifically limited, the temperature is preferably 50° C. or higher, and more preferably 70° C. or higher, and is preferably 200° C. or lower.

<Use of Vinyl Chloride Resin Composition>

The obtained vinyl chloride resin composition can be suitably used in powder molding, and more suitably used in powder slush molding.

(Vinyl Chloride Resin Molded Product)

A feature of the presently disclosed vinyl chloride resin molded product is that it is obtained by molding the vinyl chloride resin composition set forth above by any method. As a result of the presently disclosed vinyl chloride resin molded product being formed using the vinyl chloride resin composition set forth above, the presently disclosed vinyl chloride resin molded product normally contains at least the (a) vinyl chloride resin, (b) plasticizer, and (c) specific uracil compound, and has little non-uniformity in terms of thickness, density, or the like. Moreover, the presently disclosed vinyl chloride resin molded product has reduced yellowing as a result of being formed using the vinyl chloride resin composition set forth above.

Therefore, the presently disclosed vinyl chloride resin molded product can suitably be used as an automobile interior material such as a surface skin of an automobile instrument panel.

<Formation Method of Vinyl Chloride Resin Molded Product>

Although no specific limitations are placed on the mold temperature in powder slush molding in a situation in which the vinyl chloride resin molded product is formed by powder slush molding, the mold temperature is preferably 200° C. or higher, and more preferably 220° C. or higher, and is preferably 300° C. or lower, and more preferably 280° C. or lower.

The following method, for example, may be used in production of the vinyl chloride resin molded product without any specific limitations. In this method, the presently disclosed vinyl chloride resin composition is sprinkled onto a mold having a temperature within any of the ranges set forth above. The vinyl chloride resin composition is initially left for not less than 5 seconds and not more than 30 seconds and, after shaking off any excess vinyl chloride resin composition, is then further left for not less than 30 seconds and not more than 3 minutes at an arbitrary temperature. The mold is subsequently cooled to a temperature of not lower than 10° C. and not higher than 60° C., and the presently disclosed vinyl chloride resin molded product that is obtained is removed from the mold. A sheet-shaped molded product that imitates the shape of the mold is obtained.

(Laminate)

The presently disclosed laminate includes a foamed polyurethane molded product and the vinyl chloride resin molded product set forth above. The vinyl chloride resin molded product typically constitutes one surface of the laminate.

As a result of the presently disclosed laminate including a vinyl chloride resin molded product that is formed using the presently disclosed vinyl chloride resin composition and that has little non-uniformity in terms of thickness, density, or the like and reduced yellowing, the presently disclosed laminate can suitably be used as an automobile interior material forming an automobile interior component (particularly an automobile instrument panel).

The method by which the foamed polyurethane molded product and the vinyl chloride resin molded product are stacked is not specifically limited and may, for example, be a method such as described below. Specifically, (1) a method in which the foamed polyurethane molded product and the vinyl chloride resin molded product are separately prepared and are subsequently adhered to one another by thermal fusion bonding, thermal adhesion, or using a commonly known adhesive, or (2) a method in which raw materials of the foamed polyurethane molded product such as an isocyanate and a polyol are caused to react and polymerize on the vinyl chloride resin molded product while carrying out polyurethane foaming by a commonly known method to directly form the foamed polyurethane molded product on the vinyl chloride resin molded product may be adopted. The latter method (2) is more suitable because it involves a simple process and enables laminates of various different shapes to be obtained while easily achieving strong adhesion of the vinyl chloride resin molded product and the foamed polyurethane molded product.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used to measure and evaluate the coloring and powder fluidity of a vinyl chloride resin composition and the blooming resistance of a vinyl chloride resin molded product.

<Coloring>

A vinyl chloride resin composition obtained in each example or comparative example was sprinkled onto a textured mold that was heated to a temperature of 240° C. and, after being left to melt for an arbitrary time, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a 145 mm×175 mm×1 mm vinyl chloride resin molded sheet was removed from the mold as a vinyl chloride resin molded product.

Molding was also performed by the same operations as described above with the exception that the temperature of the mold was raised from 240° C. to 260° C.

The color tone of vinyl chloride resin molded sheets obtained through molding at mold temperatures of 240° C. and 260° C. was measured using a spectrophotometer (CM-700d produced by Konica Minolta, Inc.). Note that measurement was performed for a total of 9 points that were central points of 9 squares obtained by dividing up a textured surface of the vinyl chloride resin molded sheet, and an average value of a b* value was determined. The average value of the b* value for the mold temperature of 240° C. was subtracted from the average value of the b* value for the mold temperature of 260° C. so as to calculate a Δb* value. A smaller Δb* value indicates that the occurrence of yellowing is inhibited when the vinyl chloride resin composition is molded at high temperature.

<Powder Fluidity>

A vinyl chloride resin composition obtained in each example or comparative example was caused to flow into a 100 cc cylinder made of brass from a funnel of a powder property tester (TESTER TYPE 6721 produced by Nihon Abura Shikenki Co., Ltd.) so as to load the vinyl chloride resin composition into the cylinder. Thereafter, the vinyl chloride resin composition was loaded into the funnel again from the cylinder and was caused to drop onto a flat plate. The time taken for all of the vinyl chloride resin composition to fall was taken to be the number of seconds to fall. A smaller number of seconds to fall indicates that the vinyl chloride resin composition has better powder fluidity.

<Blooming Resistance>

A laminate obtained in each example or comparative example that had a vinyl chloride resin molded sheet as a surface skin lined with a foamed polyurethane molded product was heated inside a Geer oven with a temperature setting of 120° C. for 500 hours, and then a textured surface of the surface skin (vinyl chloride resin molded product) of the laminate was visually inspected to confirm whether or not blooming had occurred (whether a section having a white powdered appearance was present). In a case in which blooming does not occur, this indicates that the vinyl chloride resin molded product has excellent blooming resistance under high-temperature conditions.

Production Example

A polyester used in the examples and comparative example was produced as follows.

<Polyester A>

Adipic acid as a polybasic carboxylic acid, 3-methyl-1,5-pentanediol as a polyhydric alcohol, and 2-ethylhexanol as a stopper (terminal stopping component) were charged to a reactor, tetraisopropyl titanate was added as a catalyst, solvent was added as appropriate, and heating thereof was performed under stirring. Water produced as a by-product was removed at normal pressure and at reduced pressure, and the temperature was finally raised to 220° C. to 230° C. to complete a dehydration condensation reaction. The obtained product was then subjected to thin-film evaporation under conditions of a pressure of 4 Pa to 80 Pa and a jacket temperature of 250° C. to yield a polyester A (viscosity: 3,600 mPa·s; number-average molecular weight: 5,300; acid value: 0.32; hydroxyl value: 12.7) including 2-ethylhexoxy groups at the terminals thereof.

Example 1

<Production of Vinyl Chloride Resin Composition>

With the exception of plasticizers (trimellitic acid ester, polyester A, and epoxidized soybean oil) and vinyl chloride resin fine particles used as a dusting agent, the ingredients indicated in Table 1 were loaded into and mixed in a Henschel mixer. At the point at which the temperature of the mixture rose to 80° C., all of the plasticizers were added, and drying up of the mixture was caused to occur (i.e., the mixture changed to a dry state through absorption of the plasticizers by vinyl chloride resin particles used as a vinyl chloride resin). Thereafter, once the dried-up mixture had cooled to a temperature of 70° C. or lower, the vinyl chloride resin fine particles used as the dusting agent were added to the mixture to produce a vinyl chloride resin composition.

The obtained vinyl chloride resin composition was used to measure and evaluate coloring and powder fluidity. The results are shown in Table 1.

<Formation of Vinyl Chloride Resin Molded Product>

A vinyl chloride resin molded sheet having dimensions of 200 mm×300 mm×1 mm was produced as described below.

Specifically, the vinyl chloride resin composition obtained as described above was sprinkled onto a textured mold that was heated to a temperature of 250° C. and, after being left to melt for an arbitrary time, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a vinyl chloride resin molded sheet was removed from the mold as a vinyl chloride resin molded product.

<Formation of Laminate>

The obtained vinyl chloride resin molded sheet (dimensions: 200 mm×300 mm×1 mm) was placed inside a 200 mm×300 mm×10 mm mold with the textured surface facing downward.

A polyol mixture was separately obtained by mixing 50 parts of a PO (propylene oxide)/EO (ethylene oxide) block adduct of propylene glycol (hydroxyl value: 28; terminal EO unit content: 10%; internal EO unit content: 4%), 50 parts of a PO/EO block adduct of glycerin (hydroxyl value: 21; terminal EO unit content: 14%), 2.5 parts of water, 0.2 parts of an ethylene glycol solution of triethylenediamine (produced by Tosoh Corporation; product name: TEDA-L33), 1.2 parts of triethanolamine, 0.5 parts of triethylamine, and 0.5 parts of a foam stabilizer (produced by Shin-Etsu Chemical Co., Ltd.; product name: F-122). The obtained polyol mixture was mixed with polymethylene polyphenylene polyisocyanate (polymeric MDI) in a ratio determined to give an index of 98 so as to prepare a mixed liquid. The prepared mixed liquid was poured onto the vinyl chloride resin molded sheet that had been placed in the mold as described above. Thereafter, the mold was covered by a 348 mm×255 mm×10 mm aluminum plate to seal the mold. After sealing, the mold was left for 5 minutes so as to form a laminate in which a vinyl chloride resin molded sheet (thickness: 1 mm) as a surface skin was lined with a foamed polyurethane molded product (thickness: 9 mm; density: 0.18 g/$cm^3$). The formed laminate was removed from the mold, and blooming resistance of the vinyl chloride resin molded product was measured and evaluated by the previously described method. The result is shown in Table 1.

Examples 2 to 9

A vinyl chloride resin composition, a vinyl chloride resin molded product, and a laminate were produced in the same way as in Example 1 with the exception that the type and used amount of uracil compound were changed as indicated in Table 1. Measurements and evaluations were made in the same manner as in Example 1. The results are shown in Table 1.

Comparative Example 1

A vinyl chloride resin composition, a vinyl chloride resin molded product, and a laminate were produced in the same way as in Example 1 with the exception that a uracil compound was not used. Measurements and evaluations were made in the same manner as in Example 1. The results are shown in Table 1.

TABLE 1

| | | | Comparative Example 1 | Example 1 | Example 2 | Example 3 | Example 4 | Example 5 | Example 6 | Example 7 | Example 8 | Example 9 |
|---|---|---|---|---|---|---|---|---|---|---|---|---|
| Formulation | Vinyl chloride resin | Vinyl chloride resin particles[1] [parts by mass] | 100 | 100 | 100 | 100 | 100 | 100 | 100 | 100 | 100 | 100 |
| | | Vinyl chloride resin fine particles[2] [parts by mass] | 8 | 8 | 8 | 8 | 8 | 8 | 8 | 8 | 8 | 8 |
| | | Vinyl chloride resin fine particles[3] [parts by mass] | 8 | 8 | 8 | 8 | 8 | 8 | 8 | 8 | 8 | 8 |
| | Plasticizer | Trimellitic acid ester[4] [parts by mass] | 40 | 40 | 40 | 40 | 40 | 40 | 40 | 40 | 40 | 40 |
| | | Polyester plasticizer A [parts by mass] | 70 | 70 | 70 | 70 | 70 | 70 | 70 | 70 | 70 | 70 |
| | | Other plasticizer (epoxidized soybean oil[5]) [parts by mass] | 5 | 5 | 5 | 5 | 5 | 5 | 5 | 5 | 5 | 5 |
| | Stabilizer | Perchloric acid-substituted hydrotalcite[6] [parts by mass] | 4.5 | 4.5 | 4.5 | 4.5 | 4.5 | 4.5 | 4.5 | 4.5 | 4.5 | 4.5 |
| | | Zeolite[7] [parts by mass] | 2.4 | 2.4 | 2.4 | 2.4 | 2.4 | 2.4 | 2.4 | 2.4 | 2.4 | 2.4 |
| | | Stearoylbenzoylmethane (β-diketone)[8] [parts by mass] | 0.5 | 0.5 | 0.5 | 0.5 | 0.5 | 0.5 | 0.5 | 0.5 | 0.5 | 0.5 |
| | | Triisodecyl phosphite[9] [parts by mass] | 0.3 | 0.3 | 0.3 | 0.3 | 0.3 | 0.3 | 0.3 | 0.3 | 0.3 | 0.3 |
| | | Hindered amine light stabilizer[10] [parts by mass] | 0.2 | 0.2 | 0.2 | 0.2 | 0.2 | 0.2 | 0.2 | 0.2 | 0.2 | 0.2 |
| | | Zinc stearate[11] [parts by mass] | 0.2 | 0.2 | 0.2 | 0.2 | 0.2 | 0.2 | 0.2 | 0.2 | 0.2 | 0.2 |
| | Mold release agent | 12-Hydroxystearic acid[12] [parts by mass] | 0.2 | 0.2 | 0.2 | 0.2 | 0.2 | 0.2 | 0.2 | 0.2 | 0.2 | 0.2 |
| | Uracil compound | Uracil [parts by mass] | — | 0.2 | — | — | — | — | — | 1.0 | — | — |
| | | 6-Amino-1,3-dimethyluracil [parts by mass] | — | — | 0.3 | 0.4 | 0.5 | 0.7 | 0.8 | — | 1.0 | 3.0 |

TABLE 1-continued

| | | | Comparative Example 1 | Example 1 | Example 2 | Example 3 | Example 4 | Example 5 | Example 6 | Example 7 | Example 8 | Example 9 |
|---|---|---|---|---|---|---|---|---|---|---|---|---|
| | Silicone oil | Unmodified silicone oil(13) [parts by mass] | 0.4 | 0.4 | 0.4 | 0.4 | 0.4 | 0.4 | 0.4 | 0.4 | 0.4 | 0.4 |
| | Pigment | White color(14) [parts by mass] | 3 | 3 | 3 | 3 | 3 | 3 | 3 | 3 | 3 | 3 |
| | | Yellow color(15) [parts by mass] | 1 | 1 | 1 | 1 | 1 | 1 | 1 | 1 | 1 | 1 |
| Content of uracil compound [parts by mass/100 parts by mass of vinyl chloride resin] | | | — | 0.17 | 0.26 | 0.34 | 0.43 | 0.60 | 0.69 | 0.86 | 0.86 | 2.59 |
| Evaluation | Coloring | Δb* [° C.] | 1.2 | 0.9 | 0.8 | 0.8 | 0.6 | 0.7 | 0.7 | 1.5 | 0.7 | 0.5 |
| | Blooming resistance | Occurrence of blooming | No | No | No | No | No | No | No | No | Yes | Yes |
| | Powder fluidity | Number of seconds to fall [s] | 12.5 | 11.6 | 12.4 | 12.2 | 12.2 | 12.3 | 12.0 | 11.7 | 11.7 | 12.4 |

(1)Product name: ZEST ® (ZEST is a registered trademark in Japan, other countries, or both) 1700ZI (produced by suspension ploymerization; average degree of polymerization: 1,700; average paricle diameter: 130 μm); produced by Shin Dai-ichi Vinyl Corporation (2)Product name: ZEST PQLTX (produced by emulsion polymerization; average degree of polymerization: 800; average particle diameter: 1.8 μm); produced by Shin Dai-ichi Vinyl Corporation (3)Product name: Ryuron paste 761 (produced emulsion polymerization; average degree of polymerization: 2,100; volume-average particle diameter: 1.7 μm); produced by Tosoh Corporation (4)Product name: TRIMEX N-08; produced by Kao Corporation (5)Product name: ADK CIZER O-130S; produced by Adeka Corporation (6)Product name: ALCAMIZER ® (ALCAMIZER is registered by Kyowa Chemical Industry Co., Ltd.

(7)Product name: MIZUKALIZER DS; produced by Mizusawa Industrial Chemicals, Ltd.

(8)Product name: Karenz-DK-1; produced by Showa Denki K.K.

(9)Product name: ADK STAN SC-131; produced by Adeka Corporation (10)Product name: ADK STAB LA-72; produced by Adeka Corporation (11)Product name: SAKAI SZ2000; produced by Sakai Chemical Industry Co., Ltd.

(12)Product name: ADK STAB LS-12; produced by Adeka Corporation (13)Product name: KF-96H-3000,000cs (unmodified silicone oil(polydimethylsiloxane); viscosity: 30 × $10^4$ cs); produced by Shin-Etsu Silicone (14)Product name: DA P-1050 White; produced by Dainichiseika Color and Chemicals Mfg. Co., Ltd.

(15)Product name: DA PX-1446 Yello; produced by Dainichiseika Color and Chemicals Mfg. Co., Ltd.

It can be seen from Table 1 that the vinyl chloride resin compositions of Examples 1 to 9, which each contain a vinyl chloride resin, a specific amount of a plasticizer, and a specific amount of a uracil compound, have excellent powder fluidity.

In contrast, it can be seen that the vinyl chloride resin composition of Comparative Example 1, which does not contain a uracil compound, has poor powder fluidity.

INDUSTRIAL APPLICABILITY

According to the present disclosure, it is possible to provide a vinyl chloride resin composition having excellent powder fluidity.

Moreover, according to the present disclosure, it is possible to provide a vinyl chloride resin molded product formed using this vinyl chloride resin composition.

Furthermore, according to the present disclosure, it is possible to provide a laminate including this vinyl chloride resin molded product.

The invention claimed is:

1. A vinyl chloride resin composition comprising a vinyl chloride resin, a plasticizer, and a uracil compound, wherein
- content of the plasticizer is not less than 50 parts by mass and not more than 200 parts by mass relative to 100 parts by mass of the vinyl chloride resin,
- the plasticizer includes a polyester,
- proportional content of the polyester among the plasticizer is 50 mass % or more,
- the polyester includes 2-ethylhexanol unit as a terminal stopping component,
- the uracil compound includes 6-amino-1,3-dimethyluracil, and
- content of the uracil compound is not less than 0.25 parts by mass and not more than 0.80 parts by mass relative to 100 parts by mass of the vinyl chloride resin.

2. The vinyl chloride resin composition according to claim 1, wherein the uracil compound is indicated by formula (I), shown below, (I)

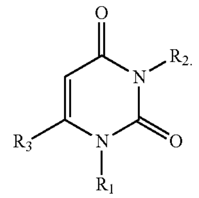

where, in formula (I):
- $R_1$ and $R_2$ each represent, independently of each other, a hydrogen atom or an electron donating group; and
- $R_3$ represents a hydrogen atom or an amino group.

3. The vinyl chloride resin composition according to claim 1 used in powder molding.

4. The vinyl chloride resin composition according to claim 1 used in powder slush molding.

5. A vinyl chloride resin molded product obtained through molding of the vinyl chloride resin composition according to claim 1.

6. The vinyl chloride resin molded product according to claim 5 for an automobile instrument panel surface skin.

7. A laminate comprising: a foamed polyurethane molded product; and the vinyl chloride resin molded product according to claim 5.

8. The laminate according to claim 7 for an automobile instrument panel.

* * * * *